Jan. 8, 1929.

C. A. FRICK 1,698,695

WINDOW LATCH

Filed Dec. 14, 1923

INVENTOR
Chester A. Frick,
BY
Arthur M. Hood.
ATTORNEY

Jan. 8, 1929.
C. A. FRICK
1,698,695
WINDOW LATCH
Filed Dec. 14, 1923
2 Sheets-Sheet 2
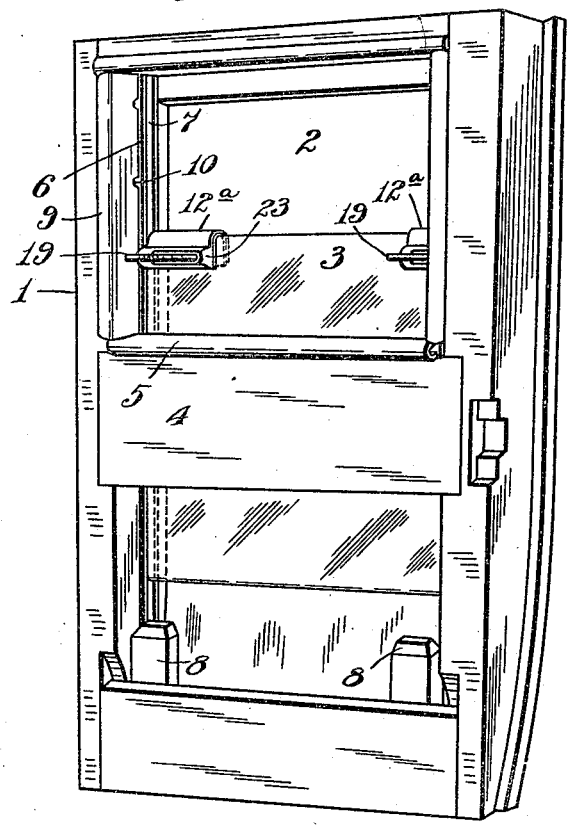
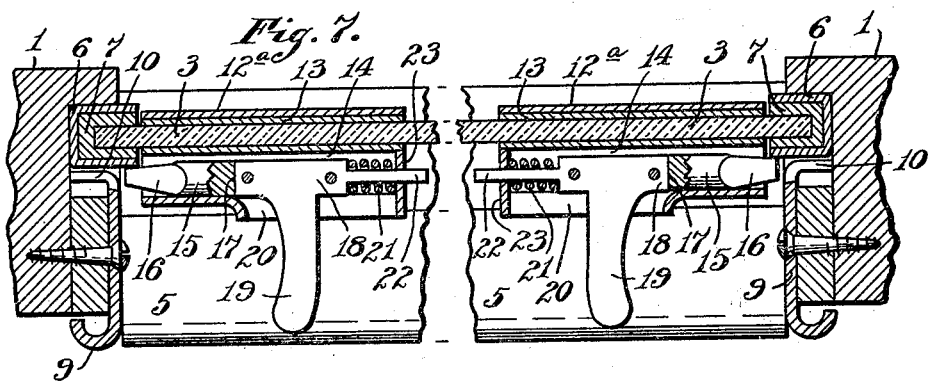
INVENTOR
Chester A. Frick,
BY
Arthur M. Hood.
ATTORNEY Patented Jan. 8, 1929.

1,698,695

UNITED STATES PATENT OFFICE.

CHESTER A. FRICK, OF MUNCIE, INDIANA, ASSIGNOR TO GLASCOCK BROTHERS MANUFACTURING COMPANY, OF MUNCIE, INDIANA, A CORPORATION OF INDIANA.

WINDOW LATCH.

Application filed December 14, 1923. Serial No. 680,782.

My invention relates to improvements in means for raising and lowering glass panes and particularly those used in automobile doors, and other glass closed openings.

One of the objects of my invention is to provide means for raising and lowering and holding in its various elevated positions the glass pane of an automobile door, which will dispense with the usual rack and gear, or chain and pinion operated raising and lowering mechanism disposed in the bottom panel of the door, whereby the thickness and weight of the door may be materially reduced.

Another object of my invention is to provide an inexpensive operating device for raising and lowering the windows of automobile doors which may be cheaply manufactured and readily assembled in position.

For the purpose of disclosing my invention I have illustrated certain embodiments thereof in the accompanying drawings in which Fig. 1 is a perspective view of an automobile coach door showing the application of my invention;

Fig. 6 is a perspective view of a door showing a modification of my invention, and Fig. 7 is a transverse sectional view of the structure shown in Fig. 6.

Figure 1:
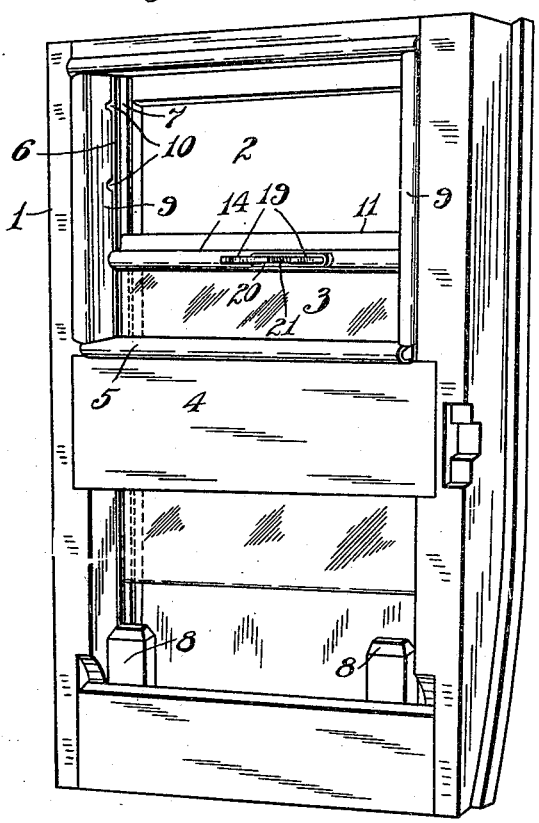

In the structure illustrated the coach door comprises the usual frame work 1 having the upper section 2 the opening of which is adapted to be closed by the window glass 3 and the lower section which is generally finished with the outer panel and the inner upholstery or the like. A cross brace 4 is arranged intermediate of the ends of the frame and supports an inner sill member 5. Arranged longitudinally on each of the vertical members of the frame are channel guides 6 in which the glass 3 is adapted to travel and these guides are provided with the usual felted fillers 7 to cushion the glass and prevent rattle. At the bottom of the frame there are provided a pair of bumper posts 8 on which the lower edge of the glass is adapted to rest when the glass is in its lowered position. Arranged on the side members of the frame and on the inner side of the door are a pair of finishing strips 9 which at suitable intervals are provided with notches 10.

The raising and lowering member for the glass is secured to the upper edge of the glass and comprises a glass gripping portion and a bolt receiving portion, the two portions being preferably formed from a single piece of sheet metal. The gripping portion comprises a U shaped strip 11 forming a receiving channel 12 into which the top edge of the glass projects, and interposed between the walls of the channel and the glass is a filler strip 13 of cork or the like. The operating strip may depend entirely upon its frictional grip on the glass to maintain it in position, although I preferably cement the strip to the glass to prevent any danger of separation. Extending laterally from the securing strip is a bolt receiving channel 14 in which operates the laterally projectable bolts 15. These bolts preferably comprise rounded pieces of material having their outer ends squared and tapered as at 16, and having extending transversely therethrough, slots 17. These slots receive the bases 18 of the finger pieces 19 which project through a slot 20 in the channel member 14 to be manipulated for retracting the bolts. The bolts are held in their projected position by means of a coil spring 21 interposed between the rear ends of the bolts and surrounding fingers 22 on the bases 18. By this arrangement the coil spring tends to project the tapered ends 16 of the bolts into the notches 10 in the finishing strips 9. At the same time, the operator by gripping the two finger pieces 19 may retract the bolts and raise and lower the glass. By tapering the bolts as indicated at 16, when the tapered ends take into the notches 10, the side taper wedges against the side of the member 6 to prevent side rattle of the glass and the two tapers filling in the notches prevent the glass from moving vertically.

Figure 2:
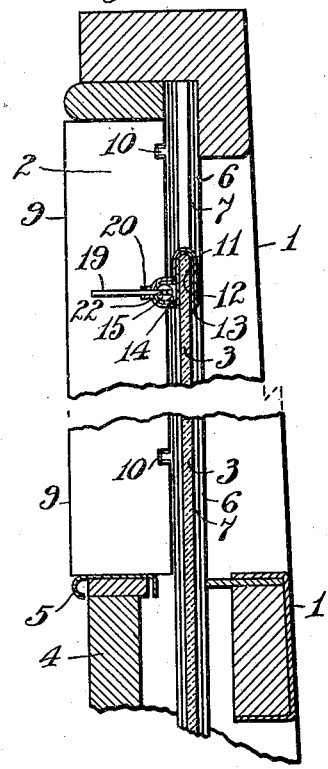
Fig. 2 is a longitudinal sectional view of the door.
Figure 3:
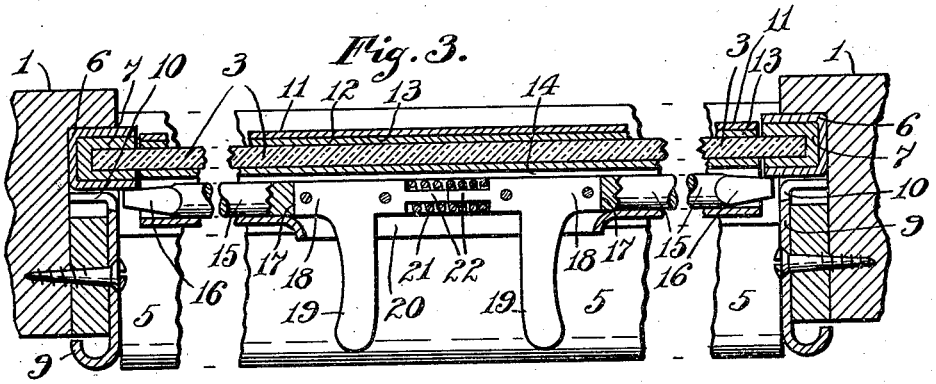
Fig. 3 is a transverse sectional view.
Figure 4:
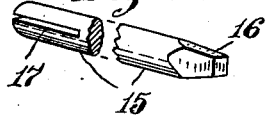
Fig. 4 is a detail perspective of one of the locking bolts.
Figure 5:
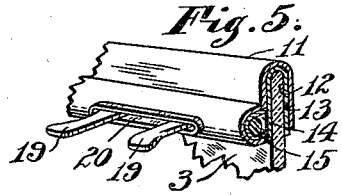
Fig. 5 is a detail perspective of the mounting member for the locking bolts.

In the structure illustrated in Figs. 6 and 7 I have shown a modified arrangement whereby a clear vision is permitted when the glass occupies an intermediate position between its raised and lowered positions. In this structure, instead of providing a continuous member 12, I provide a pair of separate members 12ª arranged at each side of the glass and having their inner ends closed by a wall 23. An operating bolt of the same construction as that disclosed in Figs. 1 to 5 is used with the exception that a separate spring 21ª is used for each bolt, which spring abuts against the rear wall 23.

I claim as my invention:

1. In a device of the character described, the combination with a frame and a glass vertically slidably mounted in said frame, of latching means therefor comprising a channelled bolt carrier embracing only the upper edge of the glass and a projectable bolt mounted therein below the upper edge of the glass and arranged to engage the sides of the frame and support the glass from its upper edge in its adjusted position, the channels of said carrier being provided with filler strips of friction material directly engaging the glass.

2. In a device of the character described, the combination with a frame and a glass vertically slidably mounted in said frame, of latching supporting means therefor operating and supporting the same from its upper edge and comprising a sheet metal channelled strip arranged to embrace only the upper edge of the glass, the channel of said strip being provided with friction filler strips directly engaging the glass, and having on one side a bolt receiving channel below the upper edge of the glass, a laterally projectable bolt mounted in said channel, a spring tending to project said bolt into engagement with the side of the frame, and an operating handle for said bolt.

3. In a device of the character described, the combination with a frame and a glass vertically slidably mounted in said frame, of latching means therefor supporting and operating said glass from its upper edge and comprising a sheet metal channelled bolt carrier arranged to embrace only the upper edge of the glass, the channel of said carrier being provided with filler strips of friction material directly engaging the glass, and having on one side thereof a bolt channel below the upper edge of the glass, a bolt slidably mounted in said channel provided at its rear end with a transversely extending slot, an operating handle for said bolt secured in said slot and means for projecting the forward end of the bolt into engagement with the side of the frame for holding the glass in its adjusted positions.

4. In a device of the character described, the combination with a frame and a glass vertically slidably mounted in said frame, of latching and supporting means therefor operating and supporting the glass from its upper edge and comprising a substantially U shaped sheet metal bolt carrier the legs of which are arranged to embrace only the upper edge of the glass, said legs being faced on their embracing sides with friction material directly in engagement with the glass, and provided on one side with a bolt receiving channel below the upper edge of the glass, a bolt slidably mounted in said channel and having its rear end transversely slotted, a handle projecting through a slot in said carrier and having its base secured in the slot in said bolt, and a spring for projecting said bolt into engagement with the side of the frame for holding the glass in its adjusted positions.

In witness whereof, I, CHESTER A. FRICK, have hereunto set my hand at Muncie, Indiana, this eleventh day of December, A. D. one thousand nine hundred and twenty-three.

CHESTER A. FRICK.